United States Patent

[11] 3,549,850

| [72] | Inventors | Terry O. Hockenberry;<br>Everard M. Williams, Pittsburgh, Pa. |
|---|---|---|
| [21] | Appl. No. | 602,723 |
| [22] | Filed | Dec. 19, 1966 |
| [45] | Patented | Dec. 22, 1970 |
| [73] | Assignee | Siltronics, Inc.<br>a corporation of Pennsylvania |

[54] CONTROL CIRCUIT FOR ELECTRIC DISCHARGE MACHINING APPARATUS
11 Claims, 22 Drawing Figs.

| [52] | U.S. Cl. | 219/69 |
|---|---|---|
| [51] | Int. Cl. | B23p 1/08 |
| [50] | Field of Search | 219/69(C), 69(P), 69(G) |

[56] References Cited
UNITED STATES PATENTS
3,035,149  5/1962  Matulaitis................. 219/69(G)

*Primary Examiner*—R. F. Staubly
*Attorney*—Buell, Blenko & Ziesenheim

ABSTRACT: We disclose a circuit arrangement for developing a control signal, said arrangement comprising circuit means for coupling said arrangement to a source of a varying input signal, a local signal generating circuit coupled to said circuit means for superimposing a gating voltage component upon said input signal to provide a gated signal, first circuit path means for sensing said gated signal when the amplitude of said input signal is above that of said voltage component, and second circuit path means for sensing said gated signal when the amplitude of said input signal is below that of said voltage component.

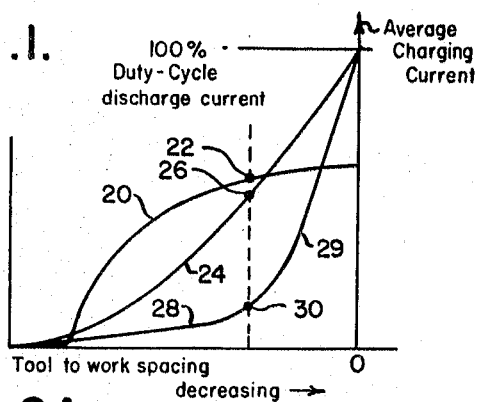
Fig. 1.
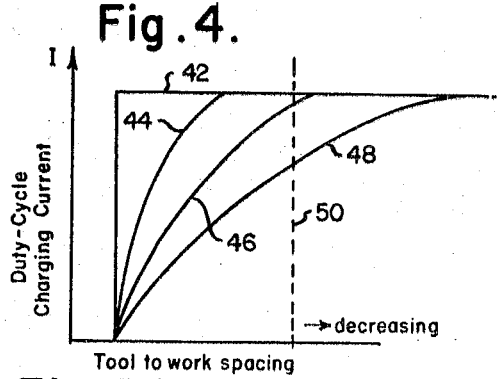
Fig. 4.
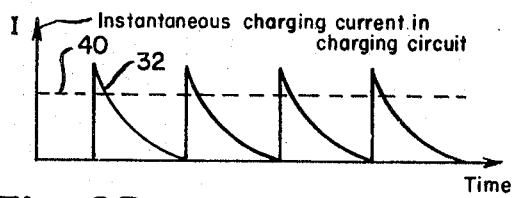
Fig. 2A.
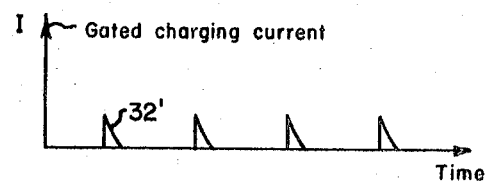
Fig. 3A.
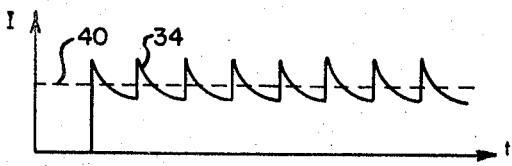
Fig. 2B.
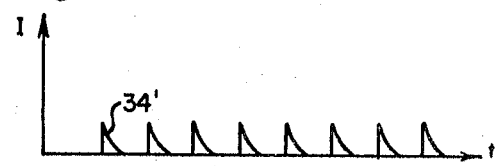
Fig. 3B.
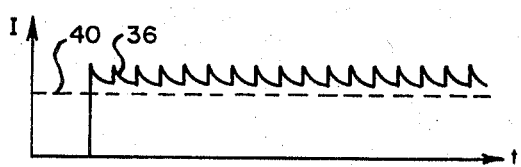
Fig. 2C.
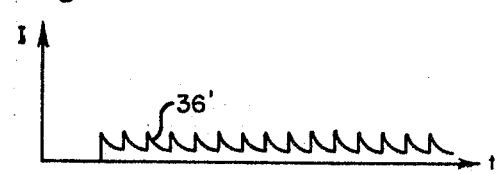
Fig. 3C.
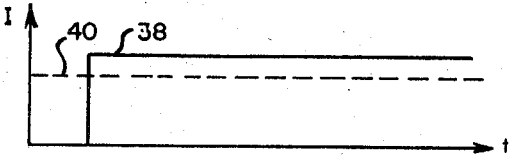
Fig. 2D.
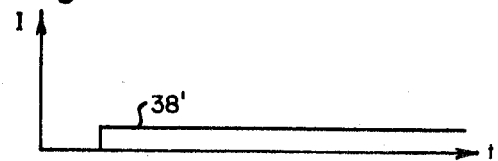
Fig. 3D.
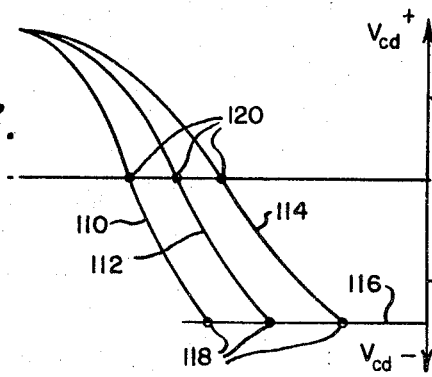
Fig. 7.
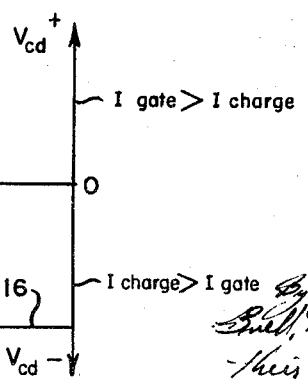
INVENTORS
Terry O. Hockenberry &
Everard M. Williams INVENTORS
Terry O. Hockenberry &
Everard M. Williams INVENTORS
Terry O. Hockenberry &
Everard M. Williams

CONTROL CIRCUIT FOR ELECTRIC DISCHARGE MACHINING APPARATUS

Our present invention relates to a positioning control for the tool-electrode of Electric Discharge Machining (EDM) apparatus having a power supply of the relaxation type.

For certain EDM operations, for example in cutting operations involving relatively high current, our present application is an improvement upon our copending application entitled Electrode Positioning Control for Electric Discharge Machining Apparatus and the Like Machine, filed concurrently herewith, Ser. NO. 602,722. Reference is also made to our aforementioned copending application for a general description of the EDM apparatus and process.

Various objects, features and advantages of the invention, together with structural and circuit details thereof will be elaborated upon during the ensuing discussion of pertinent prior art and brief and detailed descriptions of certain presently preferred methods of practicing the invention, with the discussion and descriptions being taken in conjunction with the accompanying drawings, wherein:

FIG. 1 is a graphical representation of the variation in current conditions in previously proposed positioning controls;

FIGS. 2A, 2B, 2C and 2D are graphical representations of the time behavior of the instantaneous current in the charging circuit of a relaxation-type power supply for respectively differing EDM gap widths;

FIGS. 3A, 3B, 3C and 3D are graphical representations of control signals derived in accordance with our invention from the instantaneous currents of the preceding FIGS. respectively;

FIG. 4 is a graphical representation of the variation of gated current duty-cycle characteristics in the charging circuit as a function of tool electrode to work spacing. In particular, FIG. 4 shows a family of curves representing the effects of variation in gating current levels;

FIG. 7 is a graphical representation of the variation in average control signal values showing various gating current levels and corresponding to the gated current-derived signals plotted in FIG. 4;

Figure 5:
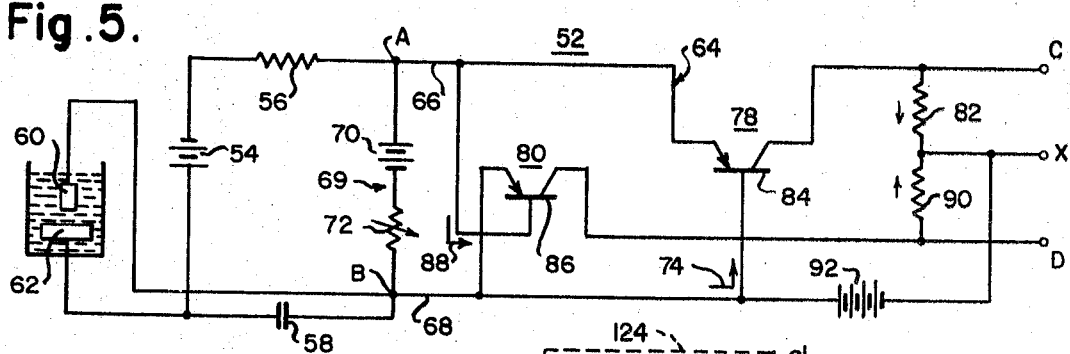
FIG. 5 is a schematic circuit diagram of one form of control circuit arranged in accordance with our invention.

The use of averaged current values in the charging circuit of a relaxation type supply as a source of control information for positioning the tool electrode dates almost from the beginning of EDM operations. In one arrangement, the charging current is passed through a solenoid coupled in electrical series between the charging resistance and the storage capacitance. The solenoid includes a ferromagnetic rod coupled to the tool electrode, and whenever the charging current becomes excessive as when a short circuit develops between the tool and workpiece, the electromagnetic force of the solenoid increases and raises the ferromagnetic rod together with the tool electrode. The solenoid is aided in this operation usually by the provision of suitable counterbalancing means such as a spring coupled to the electrode tool. Essentially, the upward force developed by the solenoid is compared with the net downward force represented by the difference between the weight of the rod and tool and the opposing counterbalancing or biasing force of the spring. When the upward and downward forces are equal, the tool presumably remains at a fixed spacing. Although the aforedescribed arrangement appears to be a workable tool positioning arrangement, it is hardly capable of the fine positioning control characterizing our previously proposed control circuits, such as disclosed and claimed in the aforementioned application or in our copending, coassigned application entitled Power Supply and Automatic Control System For High-Speed Electric Discharge Machining Apparatus filed, Aug. 30, 1965, Ser. No. 478,563, now U.S. Pat. No. 3,456,087, issued July 15, 1969.

The problem inherent in the aforedescribed solenoid positioner arises from its use of average charging current as a function of tool-to-work spacing. The average charging current of a typical relaxation type power supply is represented by curve 20 of FIG. 1, wherein average charging current is plotted vs. decreasing tool-to-work spacing of the EDM apparatus. A glance at FIG. 1 indicates that average current curve 20 flattens shortly after a particular optimum gap width 22 is passed as the gap width approaches zero. Thus, the average charging current changes rather slowly as a function of gap width in the most frequently used region of control (point 22) and particularly in the control region between optimum gap width 22 and a short circuit. Accordingly, average charging current cannot serve as an adequate source of information for precision control. This "coarse" change in control information is somewhat offset by the solenoid force being proportional to the square of the average current but this is insufficient to compensate for the inherent inaccuracy of this control scheme.

In our first-mentioned copending application, a control circuit is disclosed and claimed for utilizing the current duty-cycle in the discharge circuit of a relaxation-type supply as a source of information for control purposes. The control signal thus derived produces a precise positioning of the tool electrode for all fine machining operations and for most coarse machining operations. As denoted by curve 24 of FIG. 1, the discharge current duty-cycle does not exhibit any sharp variation in the area of its illustrated optimum gap width 26 or on either side thereof throughout the range of anticipated gap widths. However, for very coarse, high-current cutting operations it has been found that the corresponding discharge current duty-cycle curve 28 exhibits a rather steep rise as indicated by curve portion 29 shortly after the particular optimum gap width 30 shown as an example thereof is passed as the tool-to-work spacing approaches zero. This sharp rise in the discharge duty-cycle curve 28 renders the control signal derived therefrom less than precise for the aforementioned very coarse cutting operations.

Our invention broadly encompasses a signal sensing circuit arrangement comprising circuit means for coupling said arrangement to a source of a varying input signal, a local signal generating circuit coupled to said circuit means for superimposing a gating signal upon said input signal to provide a gated signal, first circuit path means for sensing said gated signal when the amplitude of said input signal is above that of said gating signal, and second circuit path means for sensing said gated signal when the amplitude of said input signal is below said gating signal. Our invention further includes novel circuit means or a load device which can be coupled to the sensing circuit and which is capable of being energized in differing manners depending on the particular circuit path means on which the signal is sensed. In a specific example of the latter form of our invention, the load device is a servomotor or other suitable driving means which is capable of being energized in either direction to move an object, whose position corresponds to the input signal, relative to environmental items, with the direction of object movement depending on the circuit path means on which the signal is sensed.

In case of EDM operations, we have discovered that a more satisfactory control signal for coarse machining conditions can be derived from a gated duty-cycle of the current in the charging circuit. This arrangement, which will be described in greater detail hereinafter eliminates the lack of precision evidenced as aforesaid by a control signal which is a function of the average current in the charging circuit or other averaged parameter in either the charging or discharging circuit. A glance at FIGS. 2A—2D shows that much information is lost by basing the control signal on the average charging current rather than on some characteristic of the instantaneous charging current. For example, in FIG. 2A curve 32 represents the time behavior of the instantaneous charging current in an EDM apparatus having a relatively large tool-to-work spacing. Similarly, curves 34 and 36 of FIGS. 2B and 2C represent respectively the behavior of the instantaneous current at medium tool-to-work spacing and at small but operable tool-to-work spacing. In FIG. 2D, curve 38 indicates a nonfluctuating flow of current characterizing a short circuit or a sustained arc when the tool-to-work spacing is too small.

In each of FIGS. 2A—2D, it will be seen that the respective charging currents represented by curves 32—38 have in common the fact that current is flowing 100 percent of the time. Therefore, a current duty-cycle is meaningless with respect to the charging circuit current, although quite significant with respect to the discharging circuit current, as set forth in our first-mentioned copending application. However, we have found that by the application of a gating current denoted by horizontal line 40 of each of FIGS. 2A through 2D a gated duty-cycle is obtained which is variably less than 100 percent for the desired ranges of control. FIGS. 3A—3D respectively indicate the variation in gated duty-cycle current for the tool-to-work spacing conditions of FIGS. 2A through 2D. Curves 32'—38π¾ , figs. 3A—3D) correspond respectively to the gated charging currents of FIGS. 2A through 2D when a gating current having the level indicated by the reference characters 40 thereof is employed. Thus, it will be seen that the gated duty-cycle for the conditions corresponding to FIGS. 2A and 2B are less than 100 percent. The gated duty-cycle for the instantaneous current of FIG. 2C likewise can be made less than 100 percent by increasing the level of the gating current 40.

In accordance with our invention, it is possible, by appropriate choice of gating level, to obtain a considerable variation in the gated duty-cycle characteristic of the charging current as a function of tool electrode spacing. Such variation in gated duty-cycle characteristic is shown in FIG. 4 wherein the family of curves 42—48 represent respectively the use of zero, low, medium and high gating current levels. Vertical chain line 50 denotes the approximate optimum gap width of the EDM apparatus for a given operation thereof. Thus, it is seen that a relatively high gating level such as represented by curves 46 and 48 offers a sufficiently varying signal from which information for control purposes can be derived for this particular operation. Moreover, regardless of the particular optimum gap width dictated by a given set of EDM conditions, there always exists a gating current level that can be selected by yield a sufficiently variable gated duty-cycle of the charging current in the vicinity of the optimum gap width.

Referring now to FIG. 5 of the drawings, an exemplary and novel circuit arrangement is disclosed for taking advantage of our aforementioned discoveries in this field. In this example, the circuit 52 includes a source of unidirectional supply potential 54, a charging resistance 56 and an electrical storage device such as capacitance 58 coupled generally in series with the potential source 54. A tool electrode 60 and workpiece 62 spaced therefrom are coupled in series across the capacitance 58. A signal amplifying circuit denoted generally by reference character 64 is coupled through conductors 66 and 68 between the capacitance 58 and its charging resistance 56 at terminals A and B. A local signal generating circuit 69, comprising in this example series-connected potential source 70 and rheostat 72, is also coupled to conductors 66 and 68.

When the EDM apparatus represented by tool 60 and workpiece 62 is operative, a gating current is caused to flow through conductors 66, 68 by the source 70, which supplies unidirectional potential, and the rheostat 72 which varies gating current level. The flow of gating current thus produced is denoted by arrow 74.

In the circuit of FIG. 5, the charging current flows between terminals A and B along conductors 68 and 66 and the gating current is superimposed upon the charging current by the local signal circuit 69. In this example, the signal circuit 69 supplies a very nearly constant current to the terminals A and B as a result of providing the source 70 with a relatively high-output voltage and variable resistance 72 with an equivalently high value. Hence, regardless of the voltage between terminals A and B, which is limited by the characteristics of transistors 78 and 80 to about a volt or so, the gating current is essentially equal to the voltage of source 70 divided by the resistance of rheostat 72 and can be set to any desirable value by adjustment of the rheostat 72.

When the gating current exceeds the charging current at a particular instant the transistor 78 becomes conductive and a voltage is developed across output resistance 82. Transistor 78 is rendered operative by the negative base current to its base 84 by excess gating current denoted as aforesaid by arrow 74. At this time, insufficient charging current is applied to base 86 of transistor 80 and, in consequence, transistor 80 remains inoperative.

As the charging current exceeds the gating current, however, the flow of charging current as denoted by arrow 88 renders the transistor 80 operative while transistor 78 becomes inoperative. As a result, a voltage is developed across load resistance 90. The characteristics of the transistors 78, 80 are conventionally such that when rendered operative as aforesaid the transistors are switched substantially fully on. The charging current level at which this switching takes place in the transistors 78, 80 is determined by source 92 of unidirectional biasing voltage. A signal thus is generated across output terminals C and D.

Figure 6A:
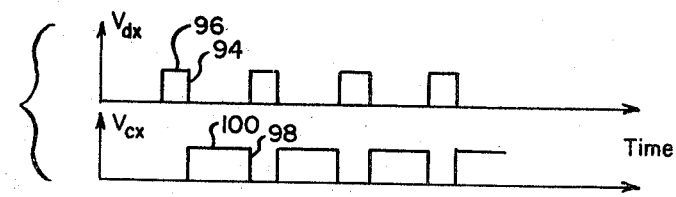
FIGS. 6A, 6B and 6C are graphical representations of the output control signals produced by the circuit of FIG. 5 and corresponding to the gated charging currents of FIGS. 3A, 3B and 3C respectively.
Figure 6B:
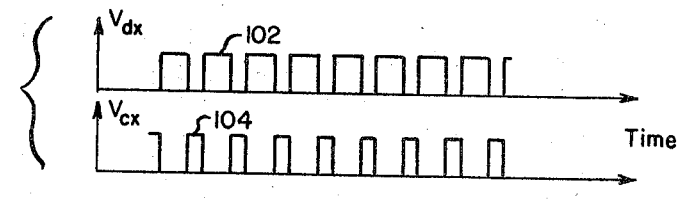
Figure 6C:
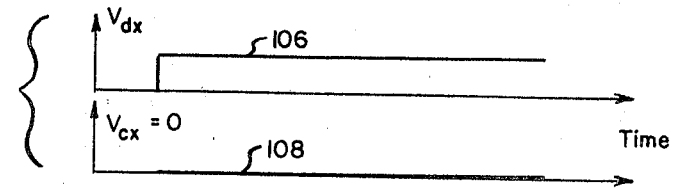

The output control signal $V^{cd}$ of the control circuit 52 can be measured across the terminals C and D, which will be the algebraic sum of the voltage drops across resistances 82 and 90. Alternatively, a pair of control signals $v_{cx}$ and $v_{dx}$ can be derived which are respectively equal to the voltage drops of resistances 82, 90 and measured across output terminals C,X and D,X respectively. $V_{cx}$ is proportional to the time that the gating current exceeds the instantaneous charging current, while $V_{dx}$ is proportional to the time in which the reverse is true. Inasmuch as the transistors 78, 80 are switched between fully off and fully on, the signal voltages $V_{cx}$, $V_{dx}$ exhibit substantially square wave forms as shown in FIGS. 6A, 6B and 6C, which correspond respectively to the gated duty-cycle curves of FIGS. 3A, 3B and 3C. For example, in FIG. 6A curve 94 exhibits plateaus 96 when the instantaneous charging current is greater than the constant gating current. On the other hand, curve 98 of FIG. 6A exhibits instantaneous plateaus 100 at those times when the constant gating current is greater than the instantaneous charging current value, when voltages are developed across resistance 90. Voltage curves 102 and 104 of FIG. 6B represent similar variations in the voltages $V_{cx}$ and $V_{dx}$ for a higher repetitive discharge rate shown in FIGS. 2B and 3B of the drawings.

On the other hand, curve 106 of FIG. 6C indicates that voltage is developed only across resistance 90 in consequence of the instantaneous charging current always being greater (100 percent gated duty-cycle) than the gating current as indicated in FIG. 3C. If desired, of course, the gating current level can be increased so that voltage curves 106, 108 of FIG. 6C become variable as in FIGS. 6A and 6B.

As stated above, the output control signal $V_{cd}$ is the algebraic sum of $V_{cx}$ and $V_{dx}$. The average value of this control signal then varies as shown in FIG. 7 where curves 110 and 112 and 114 indicate respectively the decreases in $V_{cd}$ from a positive value to a negative value as the EDM gap approaches zero for low, high and very high gating current levels. In FIG. 7, positive values of $V_{cd}$ indicate that the gating current is greater than the instantaneous charging current more than half the time, while negative values of $V_{cd}$ indicates that the gating current is greater than the instantaneous charging current less than half the time. The horizontal component 116 of the family of curves 110—114 denotes the condition where the gated duty-cycle reaches 100 percent. In others words, a positive $v_{cd}$ indicates a gated duty-cycle of greater than 50 percent while a negative $v_{cd}$ indicates a gated duty-cycle less than 50 percent. At 50 percent gated duty-cycle $v_{cd}$ equals zero since $v_{cx}$ equals $-V_{dx}$.

Knees 118 of the curves 110—114 indicate that attainment of 100 percent gated duty-cycle is displaced toward zero gap width as the gating current level is increased. The gating current level, however, cannot be increased above the peak instantaneous values of the charging current, as evident from FIGS. 2A through 2D. Thus, it will be seen that the gating current can be selected to cause the control voltage $v_{cd}$ to become zero or crossover at any tool-to-work spacing selected as optimum for a given machining operation. At the crossover points 120, $V_{cx}$ becomes equal to $-V_{dx}$ which indicates a 50 percent gated duty-cycle. At these points an adequate and effective range of control signals can be produced on each side of the optimum gap widths corresponding to these points.

In those applications wherein the charging current is too high to be carried directly by the transistors 78, 80 a current diverting shunt comprising a resistor (not shown) added to the circuit of FIG. 5 between terminals A and B, such that most of the charging current passes through this resistor and a lesser amount is diverted through the duty-cycle sensing portion of the circuit.

As indicated previously, the summation $v_{cd}$ of the output voltages or the individual output voltages $V_{cx}$, $V_{dx}$ can be utilized. A certain control circuit arrangement can be used as inputs to the conventional positioning circuit or to the position circuit shown in FIG. 8 and arranged in accordance with our invention. In the positioning circuit 122, a conventional filter network 124 is arranged for connection to terminals C, X and D of the control circuit of FIG. 5 or of FIG. 8 and to corresponding terminals C', X' and D' of the positioning circuit 122. The net effect of the filter network 124 is to smooth out the voltages $V_{dx}$ and $V_{cx}$ of FIGS. 6A, 6B and 6C as denoted by curves 126 and 128 of FIG. 9 which represent graphically the variation in filter output voltages $V_{c'x'}$, $V_{d'x'}$ respectively with gap width. Crossover point 130 of the curves 126, 128 is equivalent to one of the crossover points 120 of FIG. 7 for a given gating current level. Point 130, therefore, corresponds to optimum gap width for a given set of machining conditions and for an appropriate, preselected gating current level. FIG. 9 shows that a very precise control of gap width can be attained irrespective of whether the gap is larger or smaller than the optimum.

The input signals $v_{c'x'}$, $V_{d'x'}$ which are thus derived from the output voltages of FIG. 5 by the filter network 124 are supplied on conductors 131, 132 respectively to a pair of unijunction transistors 134 and 136. Desirably, the voltage of the crossover point 130 (FIG. 9) is set at the firing voltage of the unijunction transistors 134, 136, which typically is about 15 volts.

When the gap spacings become larger than the preset optimum value corresponding to point 130 (FIG. 9), $V_{c'x'}$ increases and $V_{d'x'}$ decreases as evident from FIG. 9. Any such decrease in $V_{d'x'}$ from the optimum control width 130 depresses $V_{d'x'}$ below the firing voltage of transistor 136 and the latter becomes nonconductive. However, the increase in $V_{c'x'}$ causes transistor 134 to conduct and a pulse of current flow through primary winding 138 of pulse transformer 140. The resulting voltage pulse across secondary winding 142 of the pulse transformer 140 renders conductive an associated silicon controlled rectifier or thyristor 144 in the armature circuit 162 of servomotor 146. In consequence, current flows through the servomotor armature 148 in such direction that the servomotor 146 drives the tool electrode 60 (FIG. 5) downwardly in the gap closing direction, until the optimum gap spacing is restored and neither of the unijunction transistors 134 and 136 are conductive.

On the other hand, as the gap spacing decreases from its optimum width corresponding to point 130 (FIG. 9), $V_{d'x'}$ increases and $V_{c'x'}$ decreases. The increase in $V_{d'x'}$ causes the associated transistor 136 to conduct, which in turn renders thyristor 150, in the aforementioned armature circuit, conductive through pulse transformed 152. In the latter case, the servomotor 146 is energized in the opposite direction owing to the reversed directional connection of thyristor 150 relative to thyristor 144. As a result, the electrode tool 60 is driven in the opposite or upward direction to correct the aforementioned decrease in gap width.

In this arrangement of the invention, the servomotor 146 has a field winding 154 coupled to a suitable source 156 of unidirectional potential, while the armature 148 is connected in series with a source 158 of fluctuating potential through power transformer 160. Accordingly, an alternating potential is applied to the armature circuit 162 including the armature 148, which potential can, of course, be rectified in a forward or reverse direction by operation of an appropriate one of thyristors 144, 150. Thus, it is not necessary to apply a source of standard potential to the positioning circuit of FIG. 8 as required in most conventional arrangements.

Figure 8:
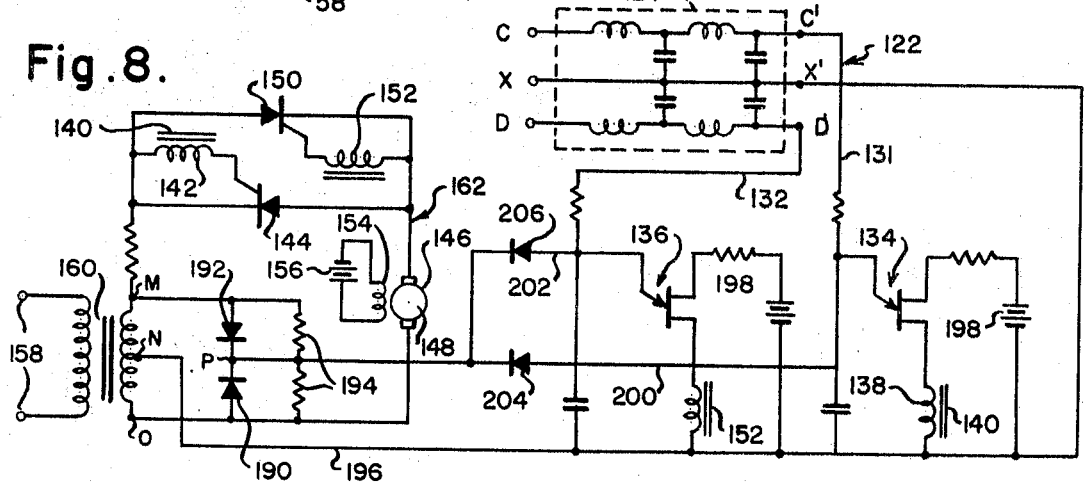
FIG. 8 is a schematic circuit diagram of a positioning circuit arranged in accordance with our invention for positioning the electrode tool in response to the signal outputs of the control circuit of FIG. 5 or FIG. 10.
Figure 9:
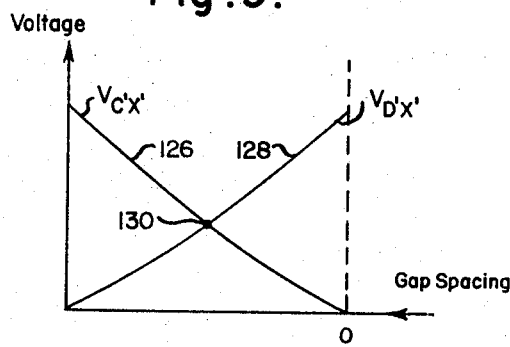
FIG. 9 is a graphical representation of the variation in the dual output control voltages of FIG. 5 as supplied to the positioning circuit of FIG. 8.

The positioning circuit of FIG. 8 desirably includes clamping circuit coupled to the emitters of unijunction transistors 134, 136 and to the secondary winding of the power transformer 160. The clamping circuit forces the emitters of 134, 136 to zero voltage at the beginning of each half cycle of the power transformer output to provide synchronization between the unijunction transistor circuit 134—136 and the associated thyristors 144, 150.

In furtherance of this purpose, the clamping circuit comprises a rectifier network including diodes 190 and 192 and resistances 194 coupled across and secondary winding of the power transformer 160. The midpoint N of the secondary winding is connected through conductor 196 to biasing potential sources 198. The emitter of each unijunction transistor 134 or 136 is coupled through conductor 200 or 202 and diode 204 or 206 to the midpoint P of the rectifier network 190—192.

Figure 9A:
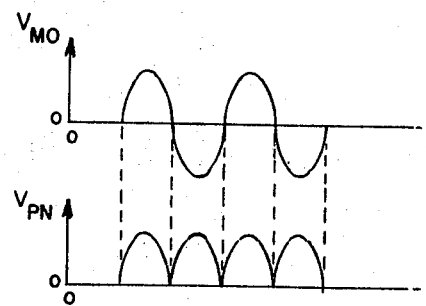
FIG. 9A is a graphical representation of the output voltage of transformer 160 of FIG. 8 and taken between points N and O thereof, as related to a clamping circuit voltage taken between points N and P of FIG. 8.

From the voltage relationships in the circuitry of FIG. 8, as depicted in FIG. 9A, it will be seen that the diodes 204 and 206 are reversed biased during each half cycle until the voltage $V_{pn}$ approaches zero at the end of each half cycle. Then diodes 204, 206 become forward biased and the emitters of unijunction transistors 134, 136 follow the voltage $V_{pn}$ to zero. Therefore, the emitters of the unijunction transistors 134, 136 are clamped to zero voltage at the end of each half cycle.

When diodes 204, 206 again become reversed biased, the aforementioned emitters are free to follow input or signal voltages $V_{c'x'}$ and $V_{d'x'}$ respectively. Assuming a condition where $V_{d'x'}$ is greater than $V_{c'x'}$ the emitter voltage of transistor 136 begins rising toward $V_{d'x'}$ in an exponential fashion, and the emitter voltage of transistor 134 begins rising toward $V_{c'x'}$ in a similar fashion. As $V_{d'x'}$ is greater than $V_{c'x'}$ the transistor 134 will never fire because $V_{c'x'}$ is below the characteristic firing voltage of transistor 134. The time within a given half cycle that transistor 136 fires (and with it thyristor 150) is determined when the emitter voltage of transistor 136 reaches the firing voltage. If $V_{d'x'}$ is very large, transistor 136 fires early in the aforesaid half cycle and substantially a full half cycle of current flows through the motor armature 148. Under these conditions the motor armature 148 rotates substantially at full motor speed. As $V_{d'x'}$ decreases in value, transistor 136 and therefore thyristor 150 fires later in the half cycle, resulting in a correspondingly slower motor speed.

The clamping circuit operates in a similar manner when $V_{c'x'}$ is greater than $V_{d'x'}$ at which time transistor 134 fires instead and with it thyristor 144 to drive the motor 146 in the opposite rotational direction.

Figure 10:
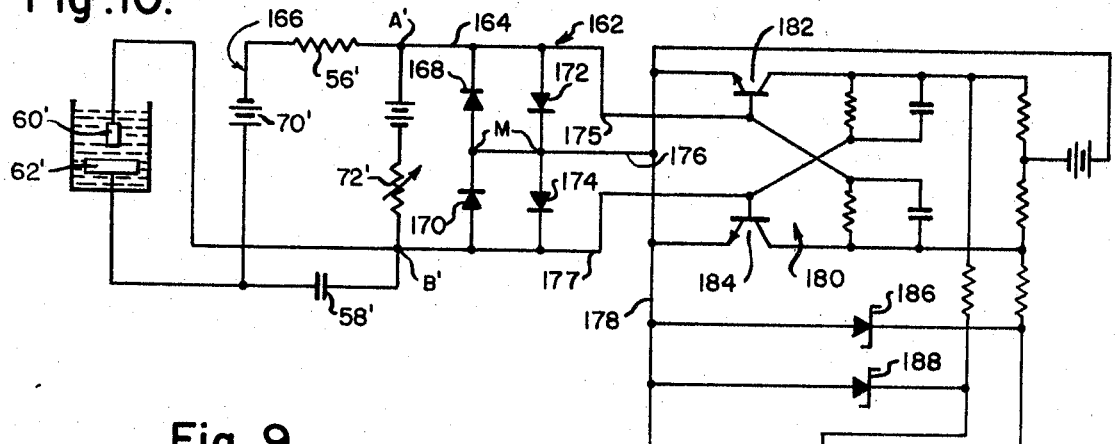
FIG. 10 is a schematic circuit diagram of another form of the control circuit of our invention; and, FIGS. 11A, 11B and 11C are graphical representations of the control signal outputs of the circuit of FIG. 10 and corresponding respectively to the gated charging currents plotted in FIGS. 3A, 3B and 3C.

Referring now to FIG. 10 of the drawings, another form 162 of our control circuit is shown therein for producing output signals at terminals D'', X'' and C''. A gated charging current input to signal network 164 is received at terminals A' and B' from a relaxation-type power supply circuit portion 166. A gating current is superimposed upon the aforementioned input by potential source 70' and rheostat 72' as described previously in connection with FIG. 5 of the drawings.

In this arrangement of our control circuit, however, pairs of diodes 168, 170 and 172, 174 are coupled between the terminals A', B' with the pair of diodes 172, 174 being directionally reversed with respect to the pair of diodes 168, 170. In a specific example of our invention, silicon diodes are utilized, which typically exhibit a forward voltage drop of about 0.7 volt per diode.

Figure 11A:
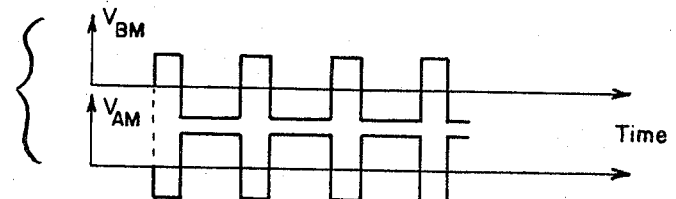
Figure 11B:
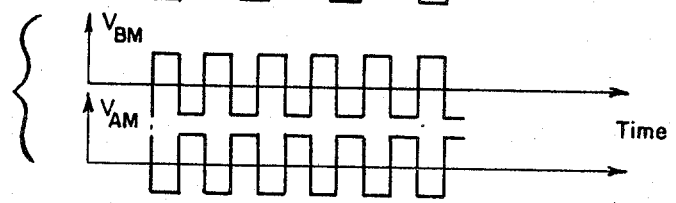
Figure 11C:
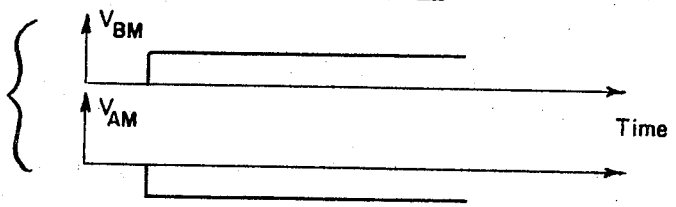

The diodes 168, 170 and 172, 174 thus constitute constant voltage drop means shunted across the local signal generating circuit 69' and having a voltage-current characteristic such that very little current flows thereacross until a current level productive of the forward voltage drop is attained. However, the rather nominal forward voltage drop of the diodes 168—174 does not afford any substantial interference to the flow of charging current between capacitance 58' and charging resistance 56'. The output of the diode network 168—174 are conducted respectively on leads 175, 176 and 177 to a flip-flop circuit 180. In furtherance of this purpose, the midpoint M of each diode branch is connected through conductors 176, 178 to the neutral output terminal X'' of the control circuit 162. The input wave forms $V_{b'm}$ and $V_{a'm}$ to the flip-flop circuit 180, for the gated charging current conditions corresponding to FIGS. 3A, 3B and 3C are plotted in FIGS. 11A, 11B and 11C respectively. It will be seen from the last-mentioned FIGS. that the signal inputs to the amplifying or flip-flop circuit 180 of the control circuit arrangement 162 are equal and opposite, with the square wave forms thereof being related to the duty-cycle of the gated charging current.

The input voltages $V_{b'm}$ and $V_{a'm}$ are applied to a bistable flip-flop circuit including transistors 182, 184. The flip-flop transistors 182, 184 therefore amplify the received signals and at the same time eliminate the negative voltage components thereof appearing in FIGS. 11A, 11B and 11C. In consequence, the output wave forms at terminals D'', X'' and C'' are similar to the output voltages of the control circuit of FIG. 5, as shown graphically in FIGS. 6A, 6B and 6C. In furtherance of this purpose, Zener diodes 186, 188 are coupled between neutral conductor 178 and the respective outputs of flip-flop transistors 182, 184. Each Zener diode 186 and 188 provides a constant voltage when its associated transistor is turned off and thereby compensates for any drift in the flip-flop circuit. The output signals of the amplifying flip-flop circuit 180, which appear respectively between output terminals D'', X'' and C'' can be applied to the positioning circuit of FIG. 10 or otherwise can be utilized for an input signal for conventional positioning circuitry as described previously in connection with FIG. 5 of the drawings.

In view of the foregoing, it will be apparent that novel and efficient forms of control and positioning circuitry have been disclosed herein for use particularly with EDM apparatus. Although the invention has been described primarily in connection with EDM operations, it will be readily apparent that our control and positioning circuits are of general utility for deriving an output signal or control voltage in response to a varying electrical characteristic and/or for controlling the position of an object in relation to other environmental items in response to such electrical characteristic. Therefore, while we have disclosed certain presently preferred embodiments of the invention and have illustrated presently preferred methods of practicing the same, it is to be distinctly understood that the invention is not limited thereto but may be otherwise variously embodied and practiced within the scope of the following claims.

We claim:

1. A circuit arrangement for developing a gap-width control signal for EDM apparatus including a tool electrode movably mounted in variably spaced relationship to a workpiece to define a discharge gap therebetween, an electric storage device coupled to said tool and said workpiece in discharge path relationship therewith, and a charging circuit for said storage device coupled thereto, said circuit arrangement including a gating current generating circuit coupled in series with said storage device and said charging circuit for superimposing a gating current signal upon charging current flowing through said device and said charging circuit, the amplitude of said gating current corresponding to a preselected width of said gap, first circuit path means coupled to said gating circuit for sensing the charging current when the amplitude thereof is greater than said gating current, and second circuit path means coupled to said gating circuit for sensing said gated charging current when the amplitude of said gating current is greater than that of said charging current.

2. The combination according to claim 1 wherein electrical positioning means are coupled to said tool electrode for advancing and withdrawing said electrode relative to said workpiece, said gating circuit including means for adjusting the level of said gating current to correspond to a preselected width within a range gap thereof, said first and said second circuit path means each having output circuit means for developing an output signal voltage having an average value corresponding to the percentage of time when the associated said amplitude is greater, and circuit means for coupling said output circuit means to said positioning means for energizing said positioning means in a direction to compensate deviations from said preselected gap.

3. The combination according to claim 11 wherein constant voltage drop means are coupled in series with said device and said charging circuit and in parallel with said gating circuit, said constant voltage drop means having a voltage-current characteristic such that very little current flows therethrough until a predetermined voltage drop thereacross is attained, and circuit means are coupled across said constant voltage drop means and across said gating circuit for conducting signal voltages generated by said gating circuit and said voltage drop means to external control mechanism for moving said tool electrode to adjust the width of said gap.

4. The combination according to claim 1 wherein said generating circuit includes a potential source and variable resistance means coupled in series to said storage device and said charging circuit.

5. The combination according to claim 1 wherein each of said first and second circuit path means include a constant voltage drop means having a voltage-current characteristic such that very little current flows therethrough until a predetermined voltage drop across said voltage drop means is attained.

6. The combination according to claim 5 wherein said first and said second circuit path means additionally include flip-flop circuit means coupled respectively to said voltage drop means.

7. The combination according to claim 1 wherein said first and said second circuit path means are coupled through a switching circuit to a pair of controlled rectifiers respectively, said rectifiers being coupled in parallel but directionally opposite relationship to a load device and to a source of alternating potential coupled in series therewith, said switching circuit being capable of passing only that signal whose amplitude is greater so as to fire the corresponding one of said silicon controlled rectifiers to energize said load device in a manner corresponding to said passed signal.

8. The combination according to claim 7 wherein said switching circuit includes a pair of unijunction transistors and a pair of pulse transformers coupled respectively to said path means and to said controlled rectifiers.

9. The combination according to claim 7 wherein said alternating potential source includes a transformer coupled to a source of fluctuating potential, and said load device is a servomotor having an armature coupled in series with a secondary winding of said coupling transformer and in series-parallel with said rectifiers, said servomotor having a field winding coupled to a source of unidirectional potential whereby said motor can be energized in either rotational direction, said motor being coupled to said tool electrode to position said electrode relative to said workpiece in response to said charging current.

10. The combination according to claim 8 wherein a clamping circuit is coupled to each of said unijunction transistors and to said alternating potential source for synchronizing said switching circuit with respect to said alternating potential source.

11. The combination according to claim 1 wherein said gating signal is an unvarying current having an amplitude less than the peak values of said charging current and each of said first and said second circuit path means include output resistance means across which an output voltage is developed in proportion to said gated charging current.